US012430464B2

(12) United States Patent
Crume et al.

(10) Patent No.: US 12,430,464 B2
(45) Date of Patent: Sep. 30, 2025

(54) DATA LEAKAGE PROTECTION USING GENERATIVE LARGE LANGUAGE MODELS

(71) Applicant: International Business Machines Corporation, Armonk, NY (US)

(72) Inventors: Jeffery Crume, Raleigh, NC (US); Aankur Bhatia, Bethpage, NY (US); Walid Rjaibi, Markham (CA); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 18/243,281

(22) Filed: Sep. 7, 2023

(65) Prior Publication Data

US 2025/0086308 A1 Mar. 13, 2025

(51) Int. Cl.
*G06F 21/62* (2013.01)
*G06F 16/242* (2019.01)

(52) U.S. Cl.
CPC ...... *G06F 21/6245* (2013.01); *G06F 16/2433* (2019.01)

(58) Field of Classification Search
CPC . G06F 21/6245; G06F 21/554; G06F 16/2433
USPC ........................................................ 726/26
See application file for complete search history.

(56) References Cited

U.S. PATENT DOCUMENTS 7,827,608 B2 11/2010 Bird et al.
9,197,628 B1 11/2015 Hastings
2020/0311569 A1* 10/2020 Ghosh .................... G06N 20/00
2022/0076118 A1* 3/2022 Faivishevsky ........... G06N 3/08
2022/0121776 A1* 4/2022 Johnston ............... G06F 21/554
2023/0128136 A1 4/2023 Sahu et al.
2024/0187071 A1* 6/2024 Li ......................... H04W 24/10
2024/0370584 A1* 11/2024 Singh .................. H04L 63/1425
(Continued)

FOREIGN PATENT DOCUMENTS

CN 111191275 A 5/2020
CN 112104655 A 12/2020
(Continued)

OTHER PUBLICATIONS

NPL Search Terms (Year: 2025).*
(Continued)

*Primary Examiner* — Syed A Zaidi
(74) *Attorney, Agent, or Firm* — CANTOR COLBURN LLP; Anthony Pallone

(57) ABSTRACT

Mechanisms are provided for automatically detecting data leakages and generating data leakage detection rules for a rules engine. The rules engine is configured with rules for identifying first sensitive data patterns in input data, and a large language model (LLM) is trained to identify second sensitive data patterns in input data. New input data is processed via the rules engine to determine whether it comprises any of the first sensitive data patterns. In response to the rules engine making a negative determination, the LLM is executed on the new input data to determine whether the new input data comprises any of the second sensitive data patterns. Responsive to a positive determination by the LLM, the rules engine is updated with a new rule based on the at least one second data pattern.

22 Claims, 6 Drawing Sheets

(56) References Cited

U.S. PATENT DOCUMENTS

| | | | | |
|---|---|---|---|---|
| 2024/0414067 A1* | 12/2024 | Yao | ......................... | H04L 41/16 |
| 2025/0093828 A1* | 3/2025 | Ahuja | ...................... | G06N 3/09 |

FOREIGN PATENT DOCUMENTS

| | | | |
|---|---|---|---|
| CN | 112507628 A | | 3/2021 |
| CN | 113177233 A | | 7/2021 |
| CN | 113254649 A | | 8/2021 |
| JP | 3725470 B2 | | 12/2005 |
| WO | WO2017050148 A1 | | 3/2017 |

OTHER PUBLICATIONS

Lin, Peiying, et al. "Latency-driven model placement for efficient edge intelligence service." IEEE Transactions on Services Computing 15.2 (2021): 591-601. (Year: 2021).*

Chong Peng. "Deep Learning Based Sensitive Data Detection" IEEE, Dec. 2022, 6 pages.

International Searching Authority, "Notification of Transmittal of the International Search Report and the Written Opinion of the International Searching Authority, or Declaration," Patent Cooperation Treaty, Nov. 25, 2024, 12 pages, International Application No. PCT/EP2024/073587.

Kužina et al. "Methods for Automatic Sensitive Data Detection in Large Datasets: a Review" IEEE, Sep. 27, 2021, 6 pages.

Liu et al. "DeID-GPT: Zero-shot Medical Text De-Identification by GPT-4", arXiv:2303.11032v1 [cs.CL], Mar. 20, 2023, 21 pages.

"What Is DLP and How Does It Work?", https://www.trellix.com/en-us/security-awareness/data-protection/how-data-loss-prevention-dlp-technology-works.html, Downloaded from the internet on Aug. 15, 2023, 8 pages.

Agrawal, ER. Garima et al., "Survey on Data Leakage Prevention through Machine Learning Algorithms", 2022 International Mobile and Embedded Technology Conference (MECON), Mar. 10-11, 2022, 3 pages.

Alneyadi, Sultan et al., "A survey on data leakage prevention systems", Journal of Network and Computer Applications, vol. 62, Feb. 2016, 2 Pages.

Katz, Gilda et al., "CoBAn: A context based model for data leakage prevention", Information Sciences, vol. 262, Mar. 20, 2014, 22 Pages.

* cited by examiner

DATA LEAKAGE PROTECTION USING GENERATIVE LARGE LANGUAGE MODELS

BACKGROUND

The present application relates generally to an improved data processing apparatus and method and more specifically to an improved computing tool and improved computing tool operations/functionality for data leakage protection using generative large language models.

Data Leakage Protection (DLP) systems address the risk of inadvertent or accidental leak of sensitive data outside authorized channels. There exist DLP systems for Data in Motion, Data in Use, and Data at Rest which rely on a set of pre-built categories of common types of sensitive data types for Payment Card Industry Data Security Standard (PCI DSS) protection and Health Insurance Portability and Accountability Action (HIPAA), etc. Depending on the specific DLP implementation, different techniques may be used for content inspection. They can be summarized as follows:

(1) Rule-Based/Regular Expressions: The most common analysis technique used in DLP involves an engine analyzing content for specific rules such as 16-digit credit card numbers, 9-digit U.S. social security numbers, etc.

(2) Database Fingerprinting: This mechanism looks at exact matches from a database dump or live database.

(3) Exact File Matching: This method matches the hashes of files against exact fingerprints.

(4) Partial Document Matching: This approach looks for complete or partial match on specific files such as multiple versions of a form that have been filled out by different users.

(5) Conceptual/Lexicon: This method uses a combination of dictionaries, rules, and policies to alert on completely unstructured ideas that defy simple categorization.

(6) Statistical Analysis: This method uses machine learning or other statistical methods such as Bayesian analysis to trigger policy violations in secure content.

(7) Machine Learning: This method uses machine learning to detect sensitive data content.

Existing DLP systems for data in motion are largely based upon keyword matching. The problem with this approach is that there can be a large number of false positives, which block the normal flow and usage of data, and false negatives, which allow for leakage of sensitive information. For example, a keyword-based analysis of a document containing the name of a sensitive project called "blue sky" would look simply for the presence of that string. However, if a document contained the sentence "today we have a clear, blue sky," which is referencing the current weather and not the sensitive project, would be flagged. Further, if another document, which was referring to the sensitive project had a misspelling such as "blu sky," then it would not be flagged even though it should be.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided that comprises configuring a rules engine with rules for identifying first sensitive data patterns in input text, and training, by a machine learning training operation, a large language model (LLM) to identify second sensitive data patterns in input data. The machine learning training operation uses labeled training data specifying input data and corresponding types of sensitive information present in the input data. The method further comprises processing new input data via the rules engine to determine whether the new input data comprises any of the first sensitive data patterns by applying the rules to the content of the new input data. Moreover, the method comprises, in response to the rules engine determining that the new input data does not have any of the first sensitive data patterns, executing the trained LLM on the new input data to determine whether the new input data comprises any of the second sensitive data patterns. In addition, the method comprises, responsive to the trained LLM determining that the new input data comprises at least one second data pattern, updating the rules engine with a new rule based on the at least one second data pattern.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
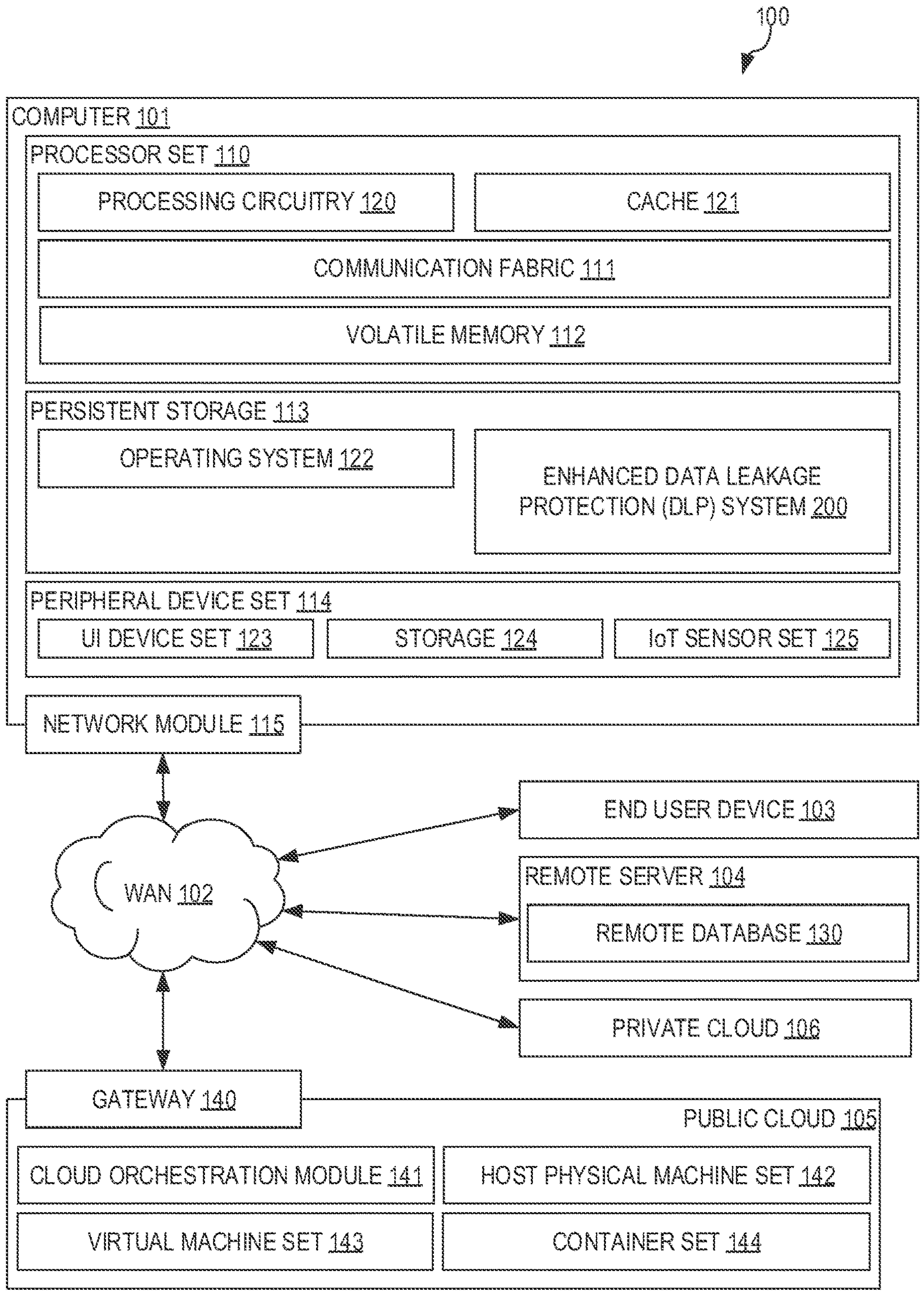
FIG. 1 is an example diagram of a distributed data processing system environment in which aspects of the illustrative embodiments may be implemented and at least some of the computer code involved in performing the inventive methods may be executed.

The illustrative embodiments provide an improved computing tool and improved computing tool operations/functionality for enhancing data leakage protection (DLP) by using generative large language computer models, i.e., a combination of large language models (LLMs) and generative artificial intelligence (AI) models. The illustrative embodiments focus on enhancing Data Leakage Protection (DLP) systems for both higher accuracy and lower latency than existing systems by using these generative large language models. The illustrative embodiments avoid the keyword-based limitations discussed above by leveraging foundation models (e.g., generative large language models) to understand the content of a document or message and infer its intent, leading to a deeper understanding of the context and the sensitivity level of the information. This capability can be leveraged to create a more intelligent DLP system for data in motion that reduces the number of false positives and false negatives through a more intelligent computer specific analysis process.

In accordance with some illustrative embodiments, the enhanced DLP system comprises a policy engine, collection engine comprising data discovery and classification logic enhanced with large language models (LLMs) and generative artificial intelligence (AI), detection engine comprising monitoring and analysis logic, and remediation engine comprising incident response and remediation logic. The illustrative embodiments may further include a reporting and analytics engine and an integration engine. These components operate together to provide higher accuracy and lower latency operations of the enhanced DLP system. The policy engine implements an artificial intelligence based rules engine operating with natural language processing and the like, to detect sensitive data leakage incidents with low latency. The rules engine may execute rules specified by users as well as those that are learned through automated generative large language computer models that are trained based on training data specifying examples of information considered sensitive, such that the generative large language computer models learn the patterns in such information indicative of sensitive information and generate appropriate classifications or predictions with regard to input data as to its sensitivity. The generative AI operates to translate the patterns of sensitive data into executable rules that may be implemented by the rules engine of the policy engine.

The collection engine collects information in various forms such as documents, emails, data bases, etc. The detection engine reads information it receives from the collection engine and determines whether the content is sensitive based upon the analysis of the generative large language computer models. The remediation engine takes corrective actions, as may be specified by a DLP analyst or other authorized personnel when configuring the enhanced DLP system, when policy violations are detected to have occurred by the detection engine. These actions could be, but are not limited to, displaying an alert on an enhanced DLP system console for an analyst to investigate, sending an alert notification to a Security Information and Event Management (SIEM) system, Security Orchestration, Automation, and Response (SOAR), or other incident management system, makes a copy of the information in question, and/or notifying the user that has violated the DLP policy, such as via email, text, or other electronic communication.

The illustrative embodiments enhance the collection engine's data discovery and classification logic by implementing large language models (LLMs) and generative artificial intelligence to perform automatic detection of sensitive data in various contexts and to automatically generate rules to expand and enhance the rules applied by a rules engine when monitoring and analyzing data accesses and transfers as part of data leak detection. A LLM is an AI computer language model built with artificial neural networks, trained using self-supervised learning or semi-supervised learning on vast amounts of textual data. LLMs have a very large scale involving millions to billions of weighted nodes. The LLMs operate using deep learning techniques taking an input text and repeatedly predicting the next token or word. Large sized models, such as Generative Pretrained Transformer (GPT)-3, can be prompt-engineered to achieve results similar to fine tuning. LLMs acquire embodied knowledge about syntax, semantics, and ontology inherent in human language corpora through the training on large scale volumes of textual data.

LLMs by their nature have a large latency and thus, may represent a significant performance overhead. To address the potential performance overhead which may be resulted from using large language computer models (LLMs) when detecting sensitive data leakage in motion, the illustrative embodiments use generative AI to produce the detection rules from what was learned from using the LLMs, and add these rules to a rules engine implemented by the policy engine. These rules will be executed first, as part of a low latency operation and, only if there is a miss by the execution of the rules engine, will the LLMs be checked to determine if sensitive data is detected and new rules need to be generated for detecting the sensitive data via the generative AI, i.e., the high latency analysis. Thus, the LLMs are used to detect sensitive data and the generative AI is used to generate rules for implementation by the policy engine to detect data leakages.

The reporting and analytics engine of the enhanced DLP system provides the necessary dashboards and analytics to analyze the performance of the enhanced DLP system, as well as to obtain insights into the incidents of data leakages identified. The integration engine of the enhanced DLP system provides the necessary components for integrating the enhanced DLP system with other security systems, such as SIEM systems or the like, so as to obtain data from a variety of sources and provide a unified view of incidents.

The LLM and generative AI enhanced mechanisms of the illustrative embodiments provide an enhanced DLP system that is able to identify data leakages in various contexts with reduced false positives and negatives that are prevalent in static rules engines. That is, because the LLMs and generative AI mechanisms are able to detect sensitive data patterns in various contexts, the enhanced mechanisms of the illustrative embodiments result in improved performance. The mechanisms of the illustrative embodiments may be implemented as and/or augment, for example, a cybersecurity analyst tool, e.g., Security Information and Event Management (SIEM) system, used to investigate incidents. With such a mechanism, the SIEM system can offer an option to analyze artifacts/documents associated with a particular case and the analyst can initiate the analysis and decide how to respond if they find that sensitive information is involved in the incident via the mechanisms of the illustrative embodiments. The mechanisms of the illustrative embodiments may also be implemented as and/or augment a data protection tool which monitors the data exchange between an application and a data server. The illustrative embodiments may offer an option to apply the enhanced content analysis of the illustrative embodiments to alert on data leakage in real time and optionally adjust the data protection rules on the fly, i.e., dynamically based on the sensitive data detection and context.

Thus, the illustrative embodiments enhance DLP systems for both accuracy and latency by leveraging large language models (LLMs) which can understand the actual content of the information being analyzed and infer the meaning and intent of that content, leading to fewer false positives and false negatives than existing systems. The sensitive information detection of the illustrative embodiments provides a higher accuracy, relies on much smaller labeled data, and can be generalized to multi-lingual data. The detection rule generation by the generative AI models produces detection rules for common sensitive information types which may be executed with lower latency than having to execute the high latency LLMs with all data leakage detection tasks. The generated rules implemented in the rules engine of the policy engine reduce latency significantly while preserving the same level of accuracy as the high latency path of the LLMs, especially for data in motion.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an enhanced data leakage protection (DLP) system implementing large language models and generative artificial intelligence computer models to detect sensitive data in various contexts and automatically generate rules for implementation in a rules engine for detecting data leakages with low latency and improved accuracy. The improved computing tool implements mechanism and functionality, such as the enhanced DLP system, which cannot be practically performed by human beings either outside of, or with the assistance of, a technical environment, such as a mental process or the like. The improved computing tool provides a practical application of the methodology at least in that the improved computing tool is able to detect data leakage incidences based on automatically generated rules that are generated using generative AI computer models based on sensitive data patterns detected by large language models (LLMs).

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as enhanced DLP system 200. In addition to enhanced DLP system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and enhanced DLP system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in enhanced DLP system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in enhanced DLP system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement an enhanced DLP system 200. The configuring of the computing device (e.g., computer 101) may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates enhance data leakage protection through implementation of large language models and generative artificial intelligence to automatically generate and apply rules by a rules engine to detect sensitive data leakage incidents and provide appropriate notifications to authorized personnel in response to such data leakage incidents.

Figure 2:
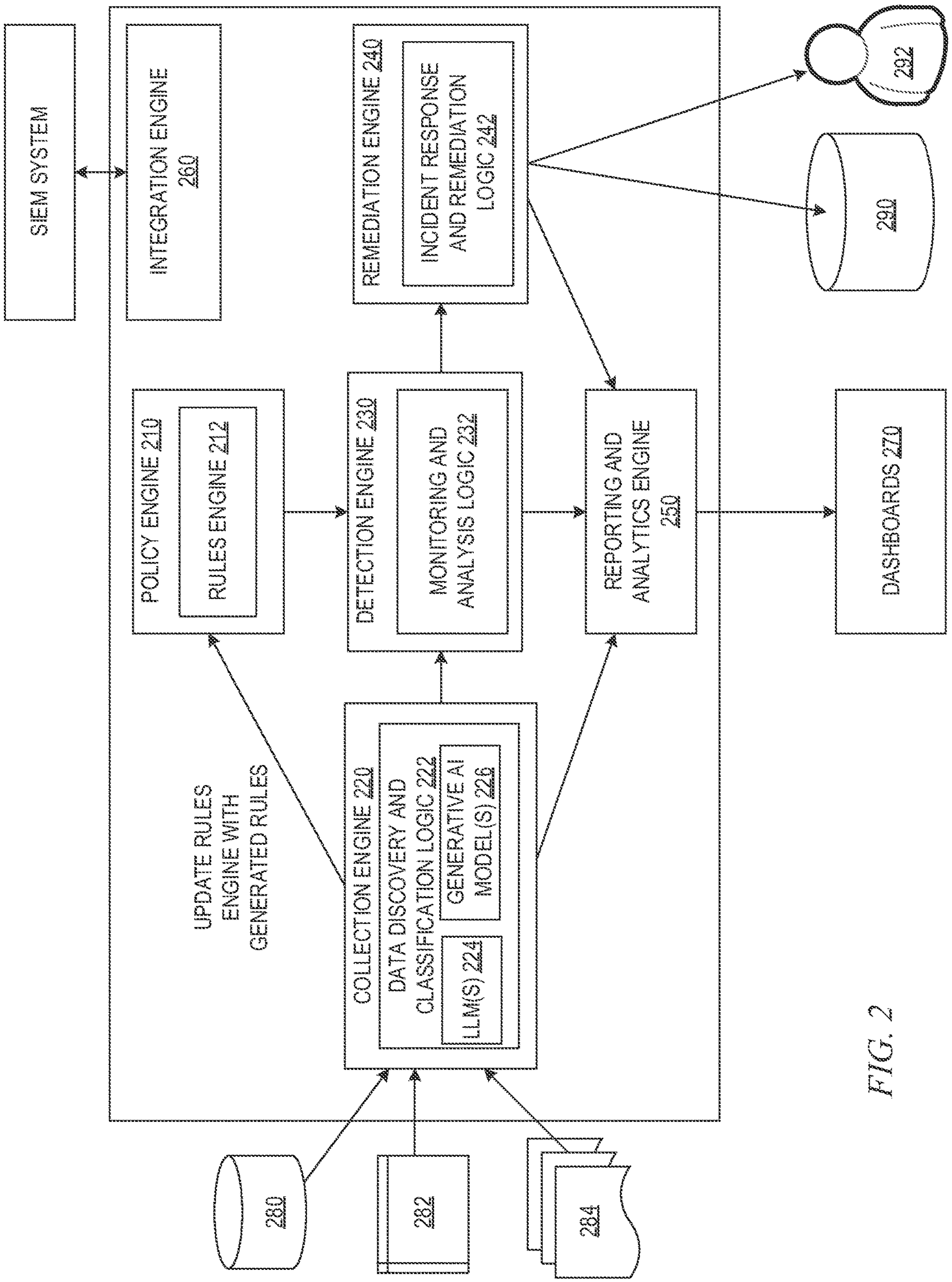
FIG. 2 is an example block diagram of the primary operation components of an enhanced data leakage protection (DLP) system in accordance with one illustrative embodiment.

FIG. 2 is an example block diagram illustrating the primary operational components of an enhanced data leakage protection (DLP) system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., requests to generate rules, and the resulting output may aid human beings, e.g., notifications of data leakage incidents. The invention is specifically directed to the automatically operating computer components directed to improving the way that data leakage protection operations of a DLP system are performed, and providing a specific solution that implements large language models (LLMs) and generative artificial intelligence models, that cannot be practically performed by human beings as a mental process and is not directed to organizing any human activity.

As shown in FIG. 2, in accordance with some illustrative embodiments, the enhanced DLP system 200 comprises a policy engine 210, collection engine 220 comprising data discovery and classification logic 222 enhanced with large language models (LLMs) 224 and generative artificial intelligence (AI) computer models 226, detection engine 230 comprising monitoring and analysis logic 232, and remediation engine 240 comprising incident response and remediation logic 242. The illustrative embodiments may further include a reporting and analytics engine 250 and an integration engine 260. These components 210-260 operate together to provide higher accuracy and lower latency operations of the enhanced DLP system 200, as discussed hereafter.

The policy engine 210 implements an artificial intelligence based rules engine 212, which may operate with natural language processing (NLP) logic or the like, to detect sensitive data leakage incidents with low latency. The rules engine 212 may execute rules specified by users as well as those that are learned through automated generative large language computer models, e.g., LLMs 222 and generative AI computer models 226, of the data discovery and classification logic 222 of the collection engine 210 that are trained based on training data specifying examples of information considered sensitive, such that the generative large language computer models, e.g., LLMS 222, learn the patterns in such information indicative of sensitive information and generate appropriate classifications or predictions with regard to input data as to its sensitivity. The generative AI 226 operates to translate the patterns of sensitive data into executable rules that may be implemented by the rules engine 212 of the policy engine 210.

The collection engine 220 collects information in various forms such as documents, emails, data bases, etc. from various data sources 280, 282, and 284. In a low latency path of execution, the collection engine 220 collects the information and provides the collected information to the detection engine 230 which works with the policy engine 210 to apply the rules of the rules engine 212 to the collected information to detect sensitive data leakage incidents via the monitoring and analysis logic 232. That is, the detection engine 230 reads information it receives from the collection engine 220 and determines whether the content is sensitive based upon the application of the rules by the rules engine 212. In a high latency path of execution, the detection engine 230 may operate based on the detection of sensitive data by large language computer models (LLMs) 224, with the generative AI computer models 226 automatically generating the rules for implementation by the rules engine 212.

The remediation engine 240 takes corrective actions, as may be specified by a DLP analyst or other authorized personnel when configuring the enhanced DLP system 200, when policy violations are detected to have occur by the detection engine 230. The incident response and remediation logic 242 maps detected data leakage incidents to responsive and/or remediation actions, which may include, for example, displaying an alert on an enhanced DLP system console or dashboard 270 for an analyst to investigate, sending an alert notification to a Security Information and Event Management (SIEM) system, Security Orchestration, Automation, and Response (SOAR) system, or other incident management system, makes a copy of the information in question and stores it in a database 290 for later analysis and review, and/or notifies the user 292 that has violated the DLP policy, such as via email, text, or other electronic communication, or the like.

The illustrative embodiments enhance the collection engine's 220 data discovery and classification logic 222 by implementing large language models (LLMs) 224 and generative artificial intelligence computer models 226 to perform automatic detection of sensitive data in various contexts and to automatically generate rules for the rules engine 212 to expand and enhance the rules applied by the rules engine 212 when monitoring and analyzing data accesses and transfers as part of data leak detection by the detection engine 230. The LLMs 224 and generative AI computer models 226 operate as part of a high latency path of execution when the rules engine 212 of the policy engine 210 fails to detect a sensitive data leakage incident because a rule is not triggered indicating a sensitive data leakage. The high latency path operates as a secondary check to determine if the LLMs 224 in fact detect a pattern that may be considered sensitive in the collected data from the data sources 280-284. The LLMs 224 identify sensitive data in accordance with their training and provide the sensitive data instances and context information to the generative AI computer models 226 which automatically generate rules that define the sensitive data and its context as recognized pattern, and a result indicating a potential data leakage should such a pattern of sensitive data and context be identified in other collected data. The automatically generated rule may then be deployed to the rules engine 212 for use in the low latency path of execution.

The reporting and analytics engine 250 of the enhanced DLP system 200 provides the necessary dashboards 270 and analytics to analyze the performance of the enhanced DLP system 200, as well as to obtain insights into the incidents of data leakages identified. The integration engine 260 of the enhanced DLP system 200 provides the necessary components for integrating the enhanced DLP system 200 with other security systems, such as SIEM systems, SOAR systems, or the like, and data source computing systems 280-284, so as to obtain data from a variety of sources and provide a unified view of incidents via the dashboards 270.

The LLM 224 and generative AI 226 enhanced mechanisms of the illustrative embodiments provide an enhanced DLP system 200 that is able to identify data leakages in various contexts with reduced false positives and negatives that are prevalent in static rules engines. Because the LLMs 224 and generative AI mechanisms 226 are able to detect sensitive data patterns in various contexts, the enhanced mechanisms of the illustrative embodiments result in improved performance. The generative AI mechanisms 226 are able to translate sensitive data patterns detected by the LLMs 224 into executable rules for use by a rules engine 212 of a low latency execution path. Thus, the illustrative embodiments enhance DLP systems for both accuracy and latency by leveraging large language models (LLMs) 224 which can understand the actual content of the information being analyzed and infer the meaning and intent of that content, leading to fewer false positives and false negatives than existing systems.

Figure 3:
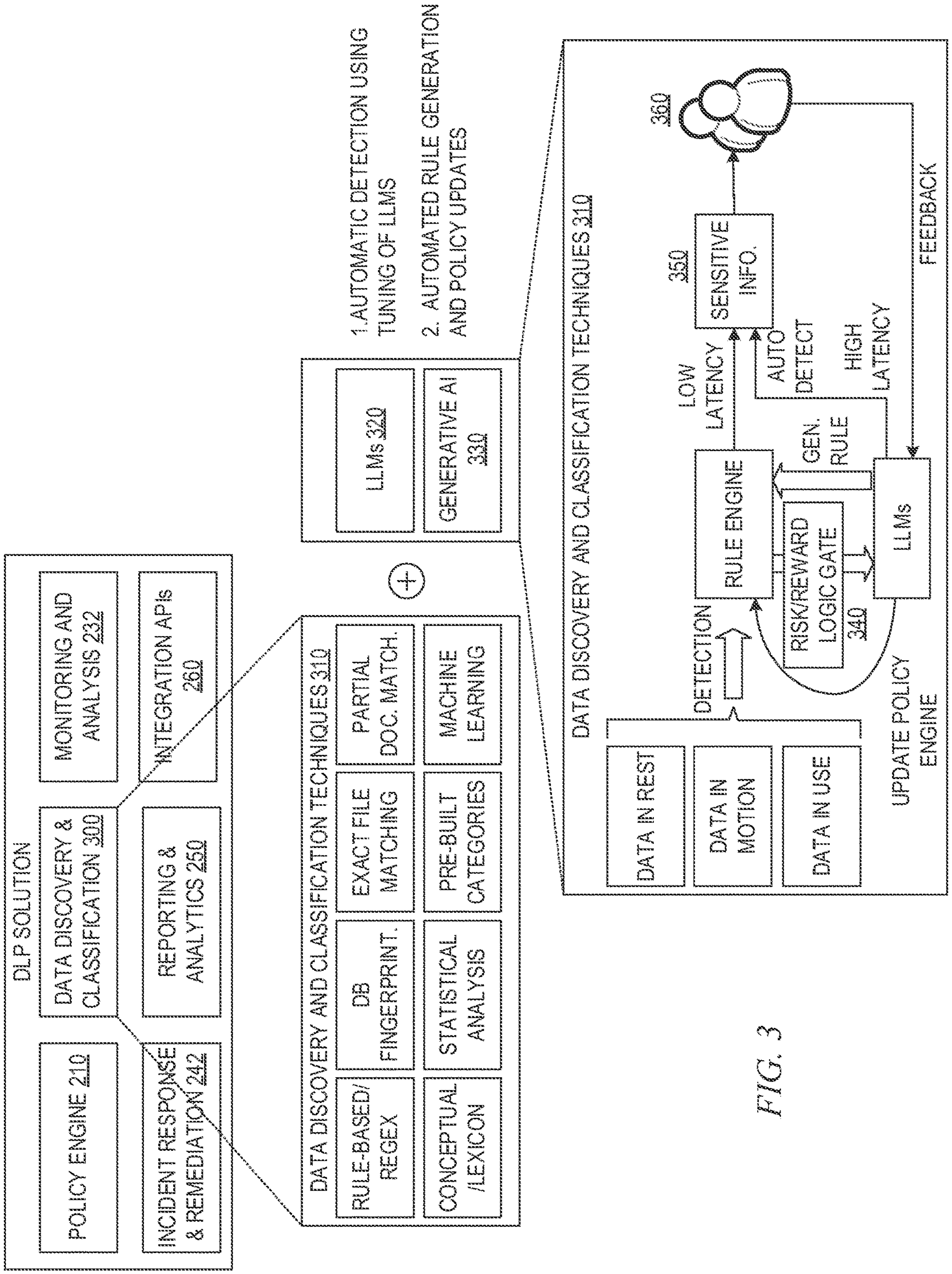
FIG. 3 is an example diagram illustrating enhanced data discovery and classification logic in accordance with one illustrative embodiment.

FIG. 3 is an example diagram illustrating enhanced data discovery and classification logic in accordance with one illustrative embodiment. The enhanced data discovery and classification logic 300 of a collection engine, such as collection engine 220 in FIG. 2, includes data discovery and classification logic 310, large language models (LLMs) 320, and generative AI computer models 330. The LLMs 320 and generative AI computer models 330 may augment the operations of the data discovery and classification logic 310 by providing additional computer functionality to detect sensitive data instances within various contexts and automatically generated rules for subsequent detection of such sensitive data instances in a low latency execution path of a rules engine.

The data discovery and classification logic 310 aims to identify and classify sensitive data across an organization's entire network. The data discovery and classification logic 310 helps to locate all sensitive data and assesses the level of risk associated with the data. Data discovery tools scan network repositories such as databases, servers, and storage devices, e.g., data sources 280-284 of FIG. 2, for data types that match predefined policies, such as data types specifying personally identifiable information (PII), e.g., credit card numbers, social security numbers, and the like, data types indicative of intellectual property, or any other data types determined to be of a sensitive nature. Once identified, the data is classified based on its level of sensitivity and the policies that apply to it. This classification enables organizations to apply the appropriate level of protection and controls to safeguard the data. By accurately identifying and classifying sensitive data, organizations can proactively protect their sensitive data, comply with regulations, and reduce the risk of data loss or theft.

Some techniques for data discovery and classification that may be implemented by the data discovery and classification logic 310 include rule-based/regular expressions, database fingerprinting, exact file matching, partial document matching, conceptual/lexicon, statistical analysis, pre-built categories, and machine learning. Rule-based/regular expression techniques implement a rules engine to analyze content for patterns matching specific predefined rules, such as 16-digit credit card numbers, 9-digit U.S. social security numbers, etc. These patterns are identified and then evaluated as to their sensitivity and corresponding applicable policies.

With database fingerprinting techniques, the techniques look for exact matches from a database dump or live database. With exact file matching, hashes of files are matched against exact fingerprints of files to ensure not tampering with the files. In partial document matching, this technique looks for complete or partial matches on specific files, such as multiple versions of a form that have been filled out by different users. With conceptual/lexicon based techniques, a combination of dictionaries, rules, and policies are used to alert on completely unstructured ideas that defy simple categorization. With statistical analysis based techniques, machine learning or other statistical methods, such as Bayesian analysis, are used to trigger policy violations in secure content. With pre-built categories based techniques, a set of pre-built categories are used with rules and dictionaries for common types of sensitive data, such as credit card numbers/PCI protection, HIPPA, etc. Machine learning techniques utilized machine learning models, e.g., Convolutional Neural Networks (CNNs), Deep Learning Neural Networks (DNNs), etc., to learn patterns for detecting sensitive data content and classify it accordingly.

As shown in FIG. 3, the illustrative embodiments add additional components to the DLP solution leveraging large language models (LLMs) 320 for performing discovery and classification of sensitive data. The illustrative embodiments address performance issues with regard to LLMs 320 by providing generative AI computer models 330 to automatically generate rules that may be added to the rules set of the rules engine for low latency execution and detection of potential data leakage incidents with a similar level of accuracy as may be obtained from the high latency execution paths of the LLMs 320.

To better understand how the illustrative embodiments enhance data discovery and classification in a DLP solution, consider a concrete example of how the illustrative embodiments may enhance a security product, which in this example is the IBM Security Guardium, available for International Business Machines (IBM) Corporation of Armonk, New York. IBM Security Guardium provides a comprehensive set of capabilities for protecting databases. One of these capabilities is user activity monitoring. In this context, Guardium monitors all the information that is exchanged between an application and a database server, and applies policies accordingly. For example, a policy may raise an alert when a DBA accesses a database sensitive table. Additionally, Guardium helps guard against data leakage by detecting sensitive data that might be exchanged between the database server and the application. This detection is based on static rules. For example, the Guardium administrator may define the following regular expression (regex) rule to check for VISA credit card numbers: regex=“^4[0-9]{12}(?:[0-9]{3})?$”.

While this is valuable, sensitive data detection that is based on static rules has some limitations. For example, consider this text: “It is March 29th and April is coming”. In this text, it is unclear as to whether April is the name of a girl or the name of a month. Sensitive data detection that is based on static rules and dictionary lookups will conclude that the sentence is about the girl called April and would generate a false positive. However, an LLM-based detection system, such as the illustrative embodiments, is able to understand the full context of the sentence and conclude that it is referring to the month of April, thereby avoiding the generation of a needless security alert.

Consider another example in which the Guardium solution, configured for use in the United States (US) of America, is deployed in another country from the US. The Guardium solution would know how to detect US passport numbers, but not necessarily numbers related to passports issues by this foreign country. Again, an LLM-based detection solution would be able to flag this foreign passport number because it takes into consideration the context in which the pattern is identified.

The illustrative embodiments utilize generative AI computer models 330 to produce an executable rule, such as a regex rule, for capturing patterns of data indicative of sensitive information within various contexts, e.g., capturing passport numbers issued by the foreign country. The rule set of the rules engine, e.g., the rules engine of the Guardium solution, may be automatically augmented with the automatically generated rule, thus permitting future detection of this pattern indicative of sensitive information, e.g., the type of passport numbers, through the generated rules and execution of these rules by the rules engine in the policy engine. This allows the enhanced DLP system to benefit from LLMs 320 while at the same time mitigate the performance overhead of checking the LLMs 320 all the time to detect sensitive data leakage, i.e., avoiding the high latency of LLMs 320.

The LLMs 320 provide a more robust classifier for sensitive information recognition. The combination of the LLMs 320 and the generative AI computer models 330 operate to automatically generate new detection rules for rules engines that improve data leakage detection performance by providing a low latency execution path. With regard to the LLMs 320, these LLMs 320 may be pretrained LLMs, such as GPT and MPT, which are trained to identify and classify sensitive and personally identifiable information (PII) data. These LLMs 320 are trained on a vast amount of text data, allowing them to be generalized to recognize patterns and identify specific types of information. The LLMs 320 may be specifically trained, such as via zero shot learning, on the task of entity and relationship/behavior recognition, such that it will automatically detect entities like file names, usernames, and the like. To use a LLM 320 for sensitive data detection and classification, the enhanced DLP system 200 trains the LLM 320 on a set of labeled data, such as a list of instances of the type “<sentence, PII data type to be extracted from the input sentence>” pairs. The trained LLM 320 can then be used to scan large volumes of data in real-time, identifying and flagging any data that matches the trained criteria.

The use of LLMs 320 in an enhanced DLP system 200 can improve accuracy and reduce false positives. Existing DLP solutions often rely on rule-based systems, which are limited to exact matches. In contrast, LLMs 320 can recognize patterns and relationships between words, allowing them to detect sensitive information appearing in different context or in slightly varied forms.

While LLM-based sensitive information recognition models perform better than other methods, the LLM 320 can fail to recognize new data types. For instance, a LLM 320 trained to recognize US passport numbers can fail to recognize Canadian passport numbers. Since it is very time consuming to construct a labeled dataset for the new type, the illustrative embodiments leverage generative AI computer models 330 for automated rule generation in the enhanced DLP system 200.

Using a LLM 320 for the detection of sensitive information offers both risks and rewards. One important risk is the detection latency associated with LLMs 320. Processing large amounts of text can be time-consuming, and real-time detection may not be feasible. This latency could result in delays in identifying and responding to sensitive information, potentially leading to security breaches or data leaks.

Another risk is the high resource requirements of LLMs 320. These models are computationally intensive, requiring powerful hardware and substantial computational resources. Implementing and maintaining such infrastructure can be expensive, making it a potential barrier for organizations with limited budgets or resources.

However, even given these risks, the rewards of using LLMs 320 for sensitive information detection are significant. LLMs 320 offer incremental detection capabilities compared to rule-based systems. They can understand context, nuances, and subtleties in language, allowing for more accurate and comprehensive detection of sensitive information. This enhances the overall effectiveness of the data discovery and classification logic of the enhanced DLP system 200 and reduces false positives and false negatives. Additionally, LLMs 320 provide broader coverage for detecting sensitive information across various domains and languages. LLMs 320 can adapt to new patterns and emerging threats, providing a higher level of security and protection.

The confidentiality and sensitivity of the data being processed also contributes to the rewards of using LLMs 320. That is, LLMs 320 can be employed in on-premises or private cloud environments, minimizing the exposure of sensitive data to external systems or networks. This ensures greater control and privacy over the information being processed.

In the illustrative embodiments, the enhanced DLP system 200 may administer a risk-reward logic gate 340 by means of a switch that may turn the LLM 320 "ON" or "OFF" for detection purposes, depending on the risk tolerance of the customer. Organizations with a higher risk tolerance and a need for comprehensive detection capabilities may find the rewards of using LLMs 320 outweigh the associated risks. However, those with stricter resource constraints, or real-time detection requirements, may need to carefully assess the trade-offs and consider alternative solutions. Thus, the implementation of the LLMs 320 and generative AI computer models 330 may be selectively enabled/disabled for various customers depending on their performance needs and risk tolerance.

As shown in FIG. 3, a collection engine collects data at rest, data in motion, and data in use, and performs sensitive data detection on the collected data via the rules engine 212 of the policy engine 210. The rules engine 212 sends sensitive information detection notifications 350 to the analyst/user 360 for review and possible providing of feedback. In this low latency execution path, the LLMs 320 and generative AI computer models 330 may not be involved. The LLMs 320 and generative AI computer models 330 may be implemented when the low latency execution path fails to identify sensitive data and the risk-reward logic gate 340 is switched on by the switch for the particular customer.

In such a case, the LLMs 320 and generative AI computer models 330 operate on the collected data to detect sensitive data patterns within the various contexts and automatically generate an executable rule for addition to the rules engine 212. The resulting sensitive information may again be provided to the analyst/user for review and feedback to the LLMs 320 and generative AI computer models 330 for fine tuning the learning of the LLMs 320. The resulting automatically generated rules may then be added to the rules engine 212 for use with subsequent sensitive data detection as part of the low latency execution path used to detect potential data leakage incidents.

Thus, if there is no sensitive data observed by the low latency execution path rule based system, the data is passed through the LLMs 320 to make sure there is not any sensitive data in the payload. If there is no sensitive data detected by the LLMs 320, it is consider a case of "no sensitive data" found. The LLMs 320 are trained to detect sensitive data outside of the purview of a typical out of box (OOB) rule based system.

The implementation of the LLMs 320 and generative AI computer models 330 provide a high latency execution pathway for detecting sensitive data patterns indicative of potential data leakage, and automated generation of rules for implementation in a low latency execution path of a rules engine 212. In the workflow of the data discovery and classification logic enhanced with the LLMs 320 and generative AI computer models 330, during an initial pass, an existing rule-based policy engine runs the sensitive data detection and generates alerts and notifications when policy violations occur, providing visibility into potential security threats and helping organizations to proactively address them. In the event of no detection, the enhanced DLP system 200 quickly switches to the LLM 320 based entity recognition system that may be preprogrammed using Supervised learning, Reinforcement learning with Human Feedback (RLHF), or prompt engineering techniques, for example. This will make sure any sensitive data with no corresponding detection rules already in the rules engine will get automatically detected by the LLMs 320.

Once the detections are done by the LLMs 320 and any alert notifications sent as sensitive information outputs to the analyst/user for the detections, the generative AI computer models 330 are used to generate a corresponding rule for any future detections of the same kind. For example, the LLMs 320 may be fine-tuned, during training stages, to generate a fixed format rule that mimics an out of the box (OOB) rule, e.g., if there is no rule to detect a confidential filename such as "ABCConfidential.doc", the LLMs 320 may be trained to create rule logic that effectively states "generate an alert if a filename is found to have a word such as "confidential". With the generative AI computer models 330, a request may be received, such as may be automatically generated based on the identified sensitive information from the LLMs 320, from a user input, or the like, to generate a particular rule to protect a specified type of sensitive information, e.g., "generate a regex rule to recognize Canadian passport numbers having 8 characters which begins with 2 letters and ends in 6 numbers." This request is processed by the generative AI computer models 330 and a corresponding rule is generated.

Generating the rule may comprise composing a query in a language (SQL, GraphQL), that takes a series of logical statements to perform an operation. Thus, the illustrative embodiments find sensitive information, that sensitive information is provided as a natural language prompt to the generative AI computer models 330, with a request to create a SQL statement that will retrieve/detect the same sensitive information across all future data. The implementation of the generated rule can be in natural language, as a structured query language (SQL) query, as a Kusto query language (KQL) query or the like.

The resulting generated rule may be provided to a system administrator, or other authorized personnel, for review and approval prior to implementation of the rule in the rules engine. Assuming that the generated rules are approved, the generated rules are used to update the rules engine of the policy engine, which runs the rules on future collections of data in use, in motion, or at rest. The LLMs 320 may continuously receive feedback from users (analysts) that will help fine tune with additional reinforcement learning.

Figure 4:
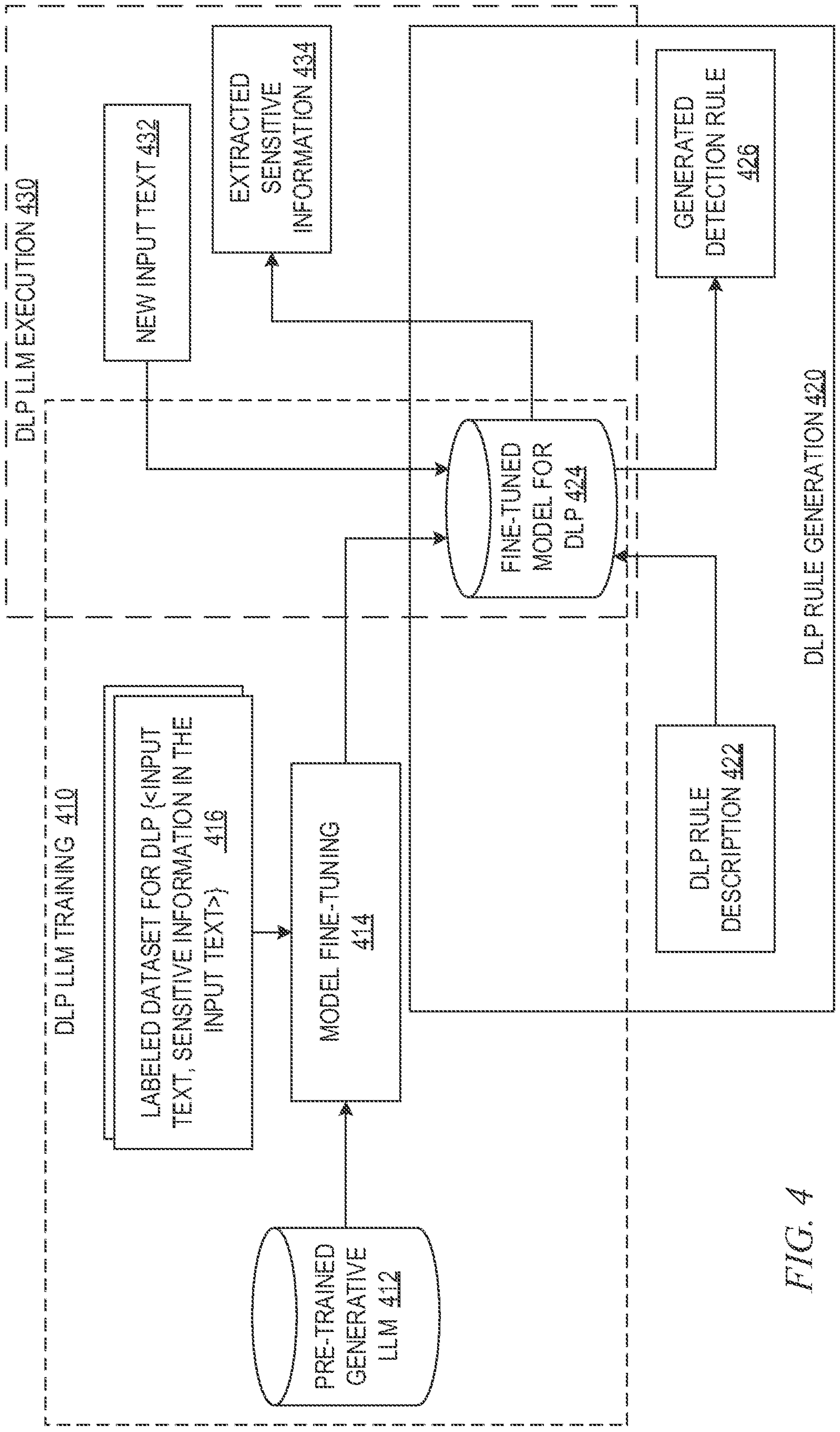
FIG. 4 is an example diagram illustrating DLP large language model (LLM) training and execution, as well as generative artificial intelligence (AI) based rule generation in accordance with one illustrative embodiment.

FIG. 4 is an example diagram illustrating DLP large language model (LLM) training and execution, as well as generative artificial intelligence (AI) based rule generation in accordance with one illustrative embodiment. As shown in FIG. 4, there are three main phases of operation including the DLP LLM training phase 410, the DLP rule generation phase 420, and the DLP LLM execution phase 430. With DLP LLM training 410, a pre-trained generative LLM 412, i.e., a LLM with generative AI computer models such as LLMs 320 and generative AI computer models 330 in FIG. 3, is provided and a model fine-tuning operation 414 is performed based on a labeled dataset for DLP 416. That is, the pre-trained generative LLM 412 is further trained based on the labeled dataset for DLP 416 to fine tune the pre-trained generative LLM 412 for use in DLP operations. The labeled dataset for DLP 416 may comprise, for example, input text along with labels specifying the sensitive information in the input text. The pre-trained generative LLM 412 is trained, through machine learning processes, to identify the sensitive information in the input text using the labels of the labeled dataset as ground truth for the training.

Once fine-tuned, the resulting fine-tuned model for DLP 424 is deployed for DLP rule generation 420 and DLP LLM execution 430. As shown, during DLP rule generation 420, an DLP rule description 422 is received that specifies a description of the DLP rule that is to be generated by the fine-tuned model for DLP 424. For example, a user may input a request to generate a DLP rule, such as via a chat interface, e.g., ChatGPT, or the like, where that request comprises a textual description of the type of sensitive data detection rule that the user wishes to have generated. For example, the user may speak or type-in a request to an interface, where speech may be converted to text using known speech-to-text conversion techniques, a request of the type "Passwords should contain at least a digit, an uppercase letter, a lowercase letter, and a special symbol. The passwords should be in length between 9 and 24 characters. Generate a regex rule to detect passwords." Alternatively, such requests to generate rules may be automatically generated by the system in response to the detection of sensitive information as previously described above.

The DLP rule description 422 is input to the fine-tuned model for DLP 424 which applies the generative AI computer models of the fine-tuned model for DLP 424 to generate a sensitive information detection rule 426 meeting the criteria of the DLP rule description 422. For example, given the above example password rule request, the generated detection rule 426 may be of a type "ˆ(?=.*\d)*?=.*[A-Z])(?=.*[a-z])(?=.*[ˆa-zA-Z\d]).(9,24)$". The generated rule 426 may be implemented in the rules engine of the policy engine to thereby update the rules executed by the rules engine. The updating of the rules engine may be predicated on authorized user review of the generated rule 426 and approval of the rule addition to the rules engine.

As shown in FIG. 4, during DLP LLM execution 430, the fine-tuned model for DLP 424 receives new input text 432 and extracts from the new input text 432, sensitive information 434 present in the new input text. As discussed previously, this operation of DLP LLM execution 430, as well as the operation of DLP rule generation 420, may be part of a high latency path of execution and invoked in response to the rules engine not detecting any sensitive information in the new input text 432 as part of a low latency path of execution.

As noted above, in some illustrative embodiments, a security analyst, or other authorized user, may provide the DLP rule description 422 in FIG. 4 for generation of a detection rule 426 for inclusion in the rules engine of the enhanced DLP system. That is, a security analyst provides a description about the target sensitive information and the fine-tuned model for DLP 424 is used to generate rules 426 that are tailored to the specific data type being protected. The security analysts can then review the automatically generated rules 426 and add them in the rules engine. These rules can be used to identify sensitive data and trigger appropriate DLP policies to prevent data loss or leakage. The use of LLMs and generative AI computer models, as in the illustrative embodiments herein, to perform automated AI based rule-writing can improve the accuracy of data classification and detection, as well as reduce the time and resources needed to write rules.

Figure 5:
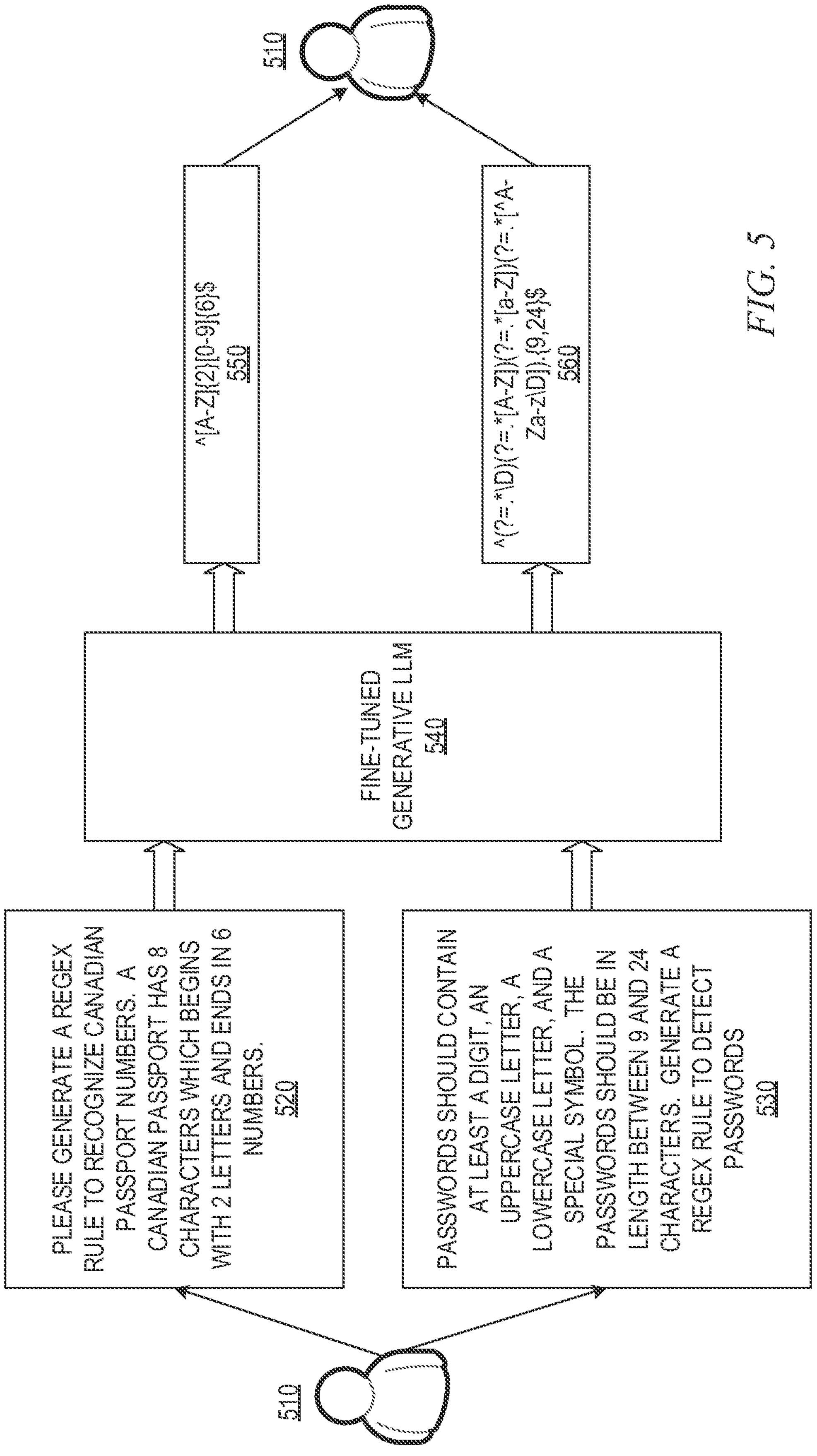
FIG. 5 is an example diagram illustrating an example of a rule generation request processing by a fine-tuned generative LLM in accordance with one illustrative embodiment.

FIG. 5 is an example diagram illustrating an example of a rule generation request processing by a fine-tuned generative LLM in accordance with one illustrative embodiment. As shown in FIG. 5, a security analyst 510 or other authorized user can generate various requests 520, 530 for rule generation that are processed by the fine-tuned generative LLM 540 to generate corresponding sensitive information detection rules 550, 560. The generated rules 550, 560 may then be output to the security analyst 510 for review and, assuming the rules meet with the security analyst's approval, may be added to the rules engine for execution as part of a low latency path of execution for identifying sensitive data in data access, transfers, and the like, which may represent data leakage incidents.

For example, the security analyst 510 may, via a chat interface, textual input interface, or the like, submit a first request 520 of the type "Please generate a regex rule to recognize Canadian passport numbers. A Canadian passport has 8 characters which begins with 2 letters and ends in 6 numbers." The fine-tuned generative LLM 540 processes this request and generate the corresponding regex rule 550 of the type "ˆ[A-Z]{2}[0-9]{6}$" which is output to the security analyst 510 for review and approval for updating the rules engine. As another example, the security analyst 510 may submit a second request 530 of the type "Passwords should contain at least a digit, an uppercase letter, a lowercase letter, and a special symbol. The passwords should be in length between 9 and 24 characters. Generate a regex rule to detect passwords." The fine-tuned generative LLM 540 processes this request and generates the corresponding regex rule 560 of the type "ˆ(?=.*\d)*?=.*[A-Z])(?=.*[a-z])(?=.*[ˆa-zA-Z\d]).(9,24)$" which is output to the security analyst 510 for review and approval for updating the rules engine.

Thus, the illustrative embodiments provide mechanisms for implementing an enhanced DLP system that includes a low latency execution path in which a rules engine of a policy engine is used to identify instances of sensitive data in monitored channels and generate corresponding alerts if it is determined that there is a possible data leakage incident. The enhanced DLP system further includes a high latency execution path in which LLMs and generative AI computer models are used to identify sensitive data instances that the rules engine may not have detected, and automatically generate rules corresponding to the identified sensitive data instances for implementation in the rules engine of the low latency execution path. Thus, the enhanced DLP system provides artificial intelligence based computer models to enhance sensitive data detection and data leakage protection.

Figure 6:
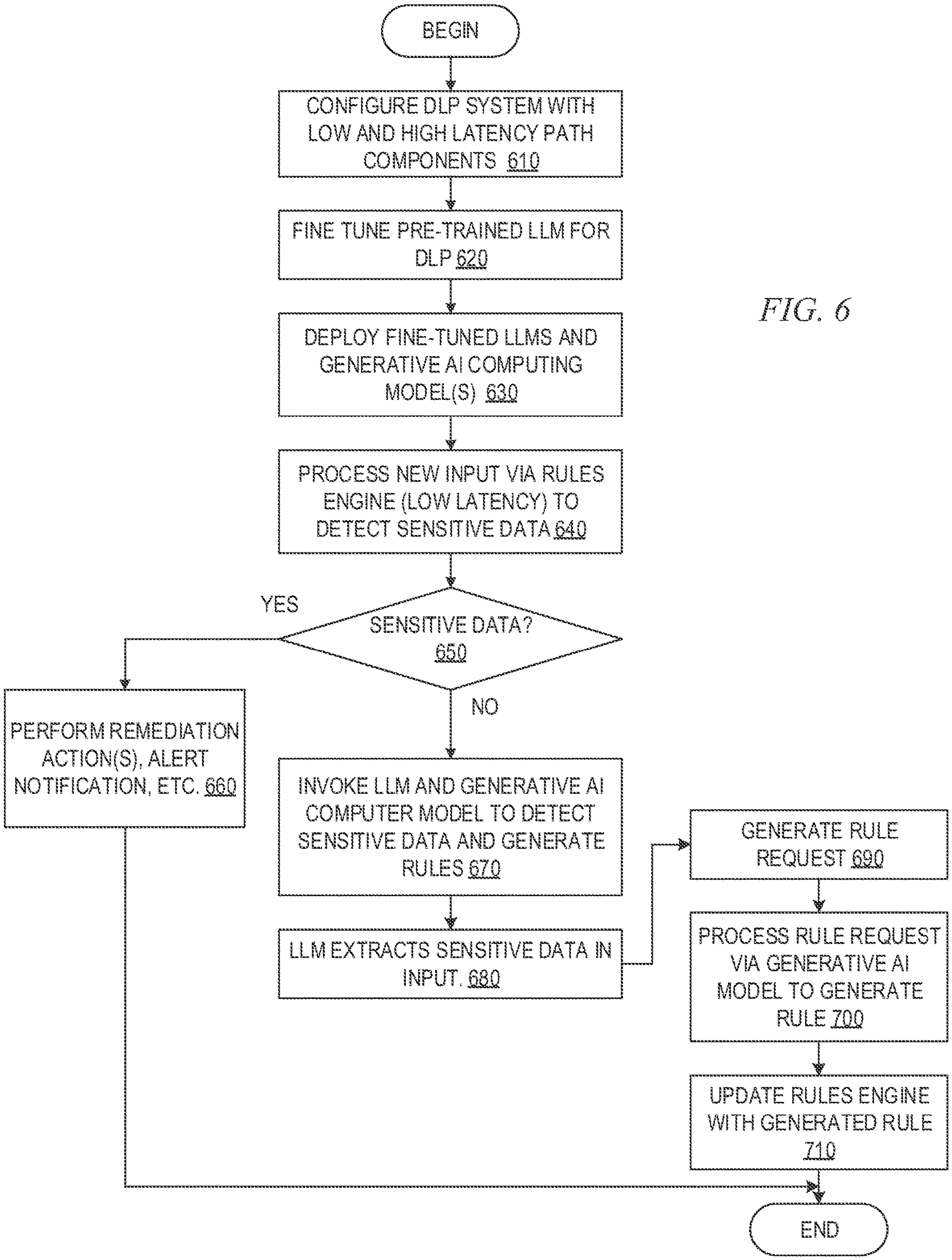
FIG. 6 is a flowchart outlining an example operation for automatically generating a sensitive information detection rule for data leakage detection in accordance with one illustrative embodiment.

FIG. 6 presents a flowchart outlining example operations of elements of the present invention with regard to one or more illustrative embodiments. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

FIG. 6 is a flowchart outlining an example operation for automatically generating a sensitive information detection rule for data leakage detection in accordance with one illustrative embodiment. As shown in FIG. 6, the operation starts by configuring the DLP system with appropriate rules in a rules engine of a policy engine, configuring the various engines and the like for DLP operations, and the like for a low latency path of execution in the enhanced DLP system, as well as configuring a pre-trained large language model and generative AI computer model for use in a high latency path of execution in the enhanced DLP system (step 610). The pre-trained large language model (LLM) is fine-tuned to perform DLP sensitive data identification (step 620). The fine tuning may involve retraining the pre-trained LLM using labeled DLP training data specifying an input text and the types of sensitive information present in the input text, for example. The resulting fine-tuned LLM may then be deployed for use in sensitive data detection and automated sensitive data detection rule generation as part of the high latency path of execution in the enhanced DLP system (step 630).

Thereafter, when a new input is received as part of the monitoring of data accesses, communication, and the like, the input is processed via the rules engine to determine if there is any sensitive data present that may be indicative of a data leakage incident (step 640). If sensitive data is detected (step 650), then a corresponding remediation action is taken and appropriate notification or alert is generated and transmitted to authorized personnel indicating the potential data leakage incident, e.g., via a dashboard or other user interface (step 660). If sensitive data is not detected by the application of the rules by the rules engine (step 650), then the LLM and generative AI computer models of the high latency execution path are invoked (step 670).

As part of the high latency execution path, the LLM executes on the input to extract any sensitive data present in the input (step 680). If no sensitive data is present, then the operation simply terminates. Assuming that sensitive data is detected by the LLM, the sensitive data is used as a basis for generating a rule request that specifies the characteristics of the sensitive data that is to be protected (step 690). The rule request is processed by the generative AI computer models to generate a corresponding sensitive data detection rule (step 700). The generated rule may then be used as a basis for updating the rules engine, potentially after authorized user review and approval (step 710). The operation then terminates. While the flowchart shows the operation terminating, it should be appreciated that the process of steps 640-710 may be repeated with each new portion of input received.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising:

configuring a rules engine with rules for identifying first sensitive data patterns in input data;

training, by a machine learning training operation, a large language model (LLM) to identify second sensitive data patterns in input data, wherein the machine learning training operation uses labeled training data specifying input data and corresponding types of sensitive information present in the input data;

processing new input data via the rules engine to determine whether the new input data comprises any of the first sensitive data patterns by applying the rules to the content of the new input data;

in response to the rules engine determining that the new input data does not have any of the first sensitive data patterns, executing the trained LLM on the new input data to determine whether the new input data comprises any of the second sensitive data patterns; and responsive to the trained LLM determining that the new input data comprises at least one second data pattern, updating the rules engine with a new rule based on the at least one second data pattern, wherein the rules engine is part of a low latency execution path and the trained LLM is part of a high latency execution path, and wherein the high latency execution path is executed only in response to the rules engine in the low latency execution path determining that the new input data does not comprise any of the first sensitive data patterns.

2. The method of claim 1, wherein updating the rules engine with the new rule comprises:

generating a request for a data leakage detection rule based on an identified portion of sensitive data in the new input data, wherein the request specifies characteristics of the portion of sensitive data to be represented in the data leakage detection rule;

executing a generative artificial intelligence computer model on the request to generate the data leakage detection rule; and updating the rules engine with the generated data leakage detection rule.

3. The method of claim 2, wherein the request is automatically generated based on the identified portion of sensitive data.

4. The method of claim 2, wherein the request is specified in natural language by an authorized user in response to a notification of the identified portion of sensitive data corresponding to the at least one second data pattern.

5. The method of claim 1, wherein, responsive to the rules engine determining that the new input data comprises at least one of the first sensitive data patterns, performing at least one remediation operation.

6. The method of claim 5, wherein the remediation operation comprises at least one of displaying an alert notification on a data leakage protection system console, sending an alert notification to a security information and event management (SIEM) system, sending an alert notification to a security orchestration, automation and response (SOAR) system, or sending a notification to a user that submitted the new input text indicating a violation of a data leakage protection policy.

7. The method of claim 1, wherein the new input data is received by performing a scan of an organization network by data discovery and classification logic to locate sensitive data.

8. The method of claim 1, wherein at least one of the first sensitive data patterns or the second sensitive data patterns comprise data patterns indicative of personally identifiable information.

9. The method of claim 1, wherein the new rule is one of a natural language rule, a structured query language (SQL) query, or a Kusto query language (KQL) query.

10. A computer program product comprising a computer readable storage medium having a computer readable program stored therein, wherein the computer readable program, when executed on a computing device, causes the computing device to:

configure a rules engine with rules for identifying first sensitive data patterns in input data;

train, by a machine learning training operation, a large language model (LLM) to identify second sensitive data patterns in input data, wherein the machine learning training operation uses labeled training data specifying input data and corresponding types of sensitive information present in the input data;

process new input data via the rules engine to determine whether the new input data comprises any of the first sensitive data patterns by applying the rules to the content of the new input data;

execute, in response to the rules engine determining that the new input data does not have any of the first sensitive data patterns, the trained LLM on the new input data to determine whether the new input data comprises any of the second sensitive data patterns; and update, responsive to the trained LLM determining that the new input data comprises at least one second data pattern, the rules engine with a new rule based on the at least one second data pattern, wherein the rules engine is part of a low latency execution path and the trained LLM is part of a high latency execution path, and wherein the high latency execution path is executed only in response to the rules engine in the low latency execution path determining that the new input data does not comprise any of the first sensitive data patterns.

11. The computer program product of claim 10, wherein the computer executable program further causes the computing device to update the rules engine with the new rule at least by:

generating a request for a data leakage detection rule based on an identified portion of sensitive data in the new input data, wherein the request specifies characteristics of the portion of sensitive data to be represented in the data leakage detection rule;

executing a generative artificial intelligence computer model on the request to generate the data leakage detection rule; and updating the rules engine with the generated data leakage detection rule.

12. The computer program product of claim 11, wherein the request is automatically generated based on the identified portion of sensitive data.

13. The computer program product of claim 11, wherein the request is specified in natural language by an authorized user in response to a notification of the identified portion of sensitive data corresponding to the at least one second data pattern.

14. The computer program product of claim 10, wherein, responsive to the rules engine determining that the new input data comprises at least one of the first sensitive data patterns, performing at least one remediation operation.

15. The computer program product of claim 14, wherein the remediation operation comprises at least one of displaying an alert notification on a data leakage protection system console, sending an alert notification to a security information and event management (SIEM) system, sending an alert notification to a security orchestration, automation and response (SOAR) system, or sending a notification to a user that submitted the new input text indicating a violation of a data leakage protection policy.

16. The computer program product of claim 10, wherein the new input data is received by performing a scan of an organization network by data discovery and classification logic to locate sensitive data.

17. The computer program product of claim 10, wherein at least one of the first sensitive data patterns or the second sensitive data patterns comprise data patterns indicative of personally identifiable information.

18. An apparatus comprising:

at least one processor; and at least one memory coupled to the at least one processor, wherein the at least one memory comprises instructions which, when executed by the at least one processor, cause the at least one processor to:

configure a rules engine with rules for identifying first sensitive data patterns in input data;

train, by a machine learning training operation, a large language model (LLM) to identify second sensitive data patterns in input data, wherein the machine learning training operation uses labeled training data specifying input data and corresponding types of sensitive information present in the input data;

process new input data via the rules engine to determine whether the new input data comprises any of the first sensitive data patterns by applying the rules to the content of the new input data;

execute, in response to the rules engine determining that the new input data does not have any of the first sensitive data patterns, the trained LLM on the new input data to determine whether the new input data comprises any of the second sensitive data patterns; and update, responsive to the trained LLM determining that the new input data comprises at least one second data pattern, the rules engine with a new rule based on the at least one second data pattern, wherein the rules engine is part of a low latency execution path and the trained LLM is part of a high latency execution path, and wherein the high latency execution path is executed only in response to the rules engine in the low latency execution path determining that the new input data does not comprise any of the first sensitive data patterns.

19. The apparatus of claim 18, wherein the instructions further cause the at least one processor to update the rules engine with the new rule at least by:

generating a request for a data leakage detection rule based on an identified portion of sensitive data in the new input data, wherein the request specifies characteristics of the portion of sensitive data to be represented in the data leakage detection rule;

executing a generative artificial intelligence computer model on the request to generate the data leakage detection rule; and updating the rules engine with the generated data leakage detection rule.

20. The apparatus of claim 18, wherein, responsive to the rules engine determining that the new input data comprises at least one of the first sensitive data patterns, performing at least one remediation operation.

21. The apparatus of claim 18, wherein the new input data is received by performing a scan of an organization network by data discovery and classification logic to locate sensitive data.

22. The apparatus of claim 18, wherein at least one of the first sensitive data patterns or the second sensitive data patterns comprise data patterns indicative of personally identifiable information.

* * * * *